United States Patent [19]
DeJong

[11] 4,217,976
[45] Aug. 19, 1980

[54] ELECTROMAGNETIC BAND CLUTCH

[75] Inventor: Allen W. DeJong, Chatham, Canada

[73] Assignee: Canadian Fram Ltd., Chatham, Canada

[21] Appl. No.: 900,829

[22] Filed: Apr. 28, 1978

[51] Int. Cl.² .................. F16D 27/02; F16D 13/10
[52] U.S. Cl. .................. 192/84 T; 192/80; 192/82 T
[58] Field of Search .......... 192/82 T, 84 T, 80, 192/81 R, 81 C; 188/77 R, 77 W

[56] References Cited

U.S. PATENT DOCUMENTS

| | | | |
|---|---|---|---|
| 1,077,805 | 11/1913 | Collier | 192/84 T |
| 1,886,692 | 11/1932 | Kapitza et al. | 192/81 C |
| 2,052,846 | 9/1936 | Ryba | 192/84 T X |
| 2,955,680 | 10/1960 | Caero | 188/70 |
| 3,129,798 | 4/1964 | Rabinow | 192/84 T |
| 3,491,866 | 1/1970 | Birdsall | 192/84 T |

FOREIGN PATENT DOCUMENTS

| | | |
|---|---|---|
| 437162 | 10/1935 | United Kingdom . |
| 559282 | 2/1944 | United Kingdom . |
| 647832 | 12/1950 | United Kingdom . |

*Primary Examiner*—Allan D. Herrmann
*Attorney, Agent, or Firm*—Ken C. Decker; William N. Antonis

[57] ABSTRACT

An electromechanical clutch for vehicle engine cooling fans includes a driving member mounted for rotation by the vehicle engine and a driven member rotatably mounted on the driving member. The driven member carries the engine cooling fan. One end of a metal band is connected to the driven member, and wraps circumferentially around the driving member in the direction of rotation of the latter. An electromagnetic coil comprising windings wound circumferentially around the driving member and rotatable therewith exert an electromagnetic force on the band when current is transmitted to the coil, drawing the band into engagement with the outer circumferential surface of the driving member, to thereby engage the clutch and cause the engine cooling fan to be rotated with the driving member. Because of the wrapping effect of the band when it engages the outer circumferential surface of the driving member, the electromagnetic force necessary to actuate the clutch is multiplied as the clutch is engaged through the servo action caused by the band wrapping around the driving member. The electrical signal is transmitted to the coil through a slip ring, and is controlled by conventional engine temperature and/or pressure sensors.

9 Claims, 2 Drawing Figures

ELECTROMAGNETIC BAND CLUTCH

BACKGROUND OF THE INVENTION

This invention relates to an electromechanical clutch for an engine cooling fan.

Experience has conclusively demonstrated that operation of the engine cooling fan is necessary only during a relatively small percentage of the time that a vehicle engine is operated. If the fan is driven when it is not necessary, the power used to rotate the fan is wasted, thereby increasing gasoline consumption. Accordingly, it is desirable to provide a device which disconnects the fan during certain engine operating conditions. Existing clutches used to control operation of engine cooling fans are torque limiting viscous devices, and are responsive to ambient air temperature at the clutch. However, clutches of this type are relatively heavy, expensive, and inefficient.

SUMMARY OF THE INVENTION

Accordingly, an important object of my invention is to provide a clutch for an engine cooling fan which is responsive to engine temperature and/or pressure in the vehicle air conditioning system to control operation of the engine cooling fan.

Another important object of my invention is to provide an electromechanical clutch which is cost competitive with existing viscous clutches.

Still another important object of my invention is to provide an electromechanical clutch for an engine cooling fan which weighs substantially less than existing viscous clutches.

Another important object of my invention is to provide an electromechanical clutch for an engine cooling fan which engages the fan only when its cooling effect is necessary.

Still another important object of my invention is to provide an electromechanical clutch for a vehicle engine cooling fan in which the size of the electromagnetic coil, and the power generated by it, are minimized.

A still further important object of my invention is to provide an electromechanical clutch which magnifies the force of the electromagnetic actuator mechanically to provide proper engagement and disengagement of the clutch mechanism.

DETAILED DESCRIPTION

Figure 1:
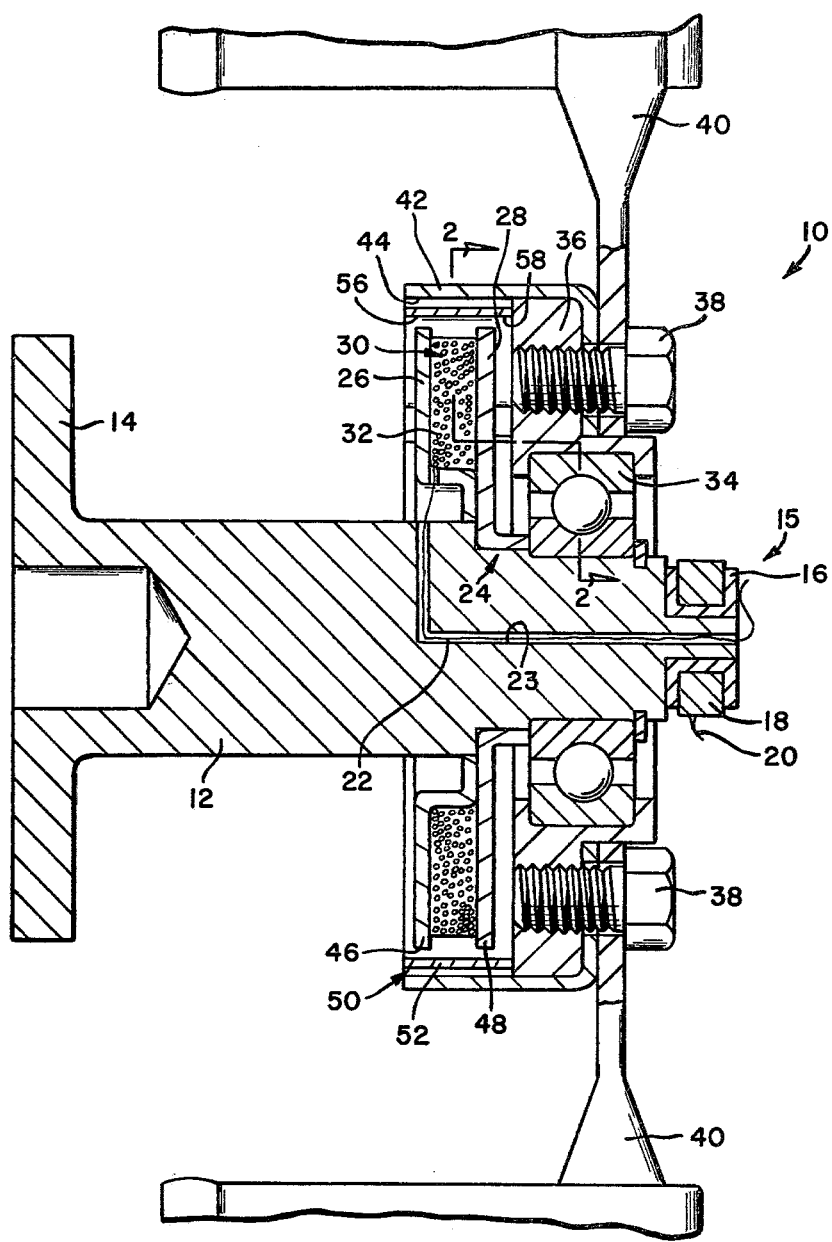
FIG. 1 is an axial cross sectional view of a clutch and fan assembly made pursuant to the teachings of my present invention.
Figure 2:
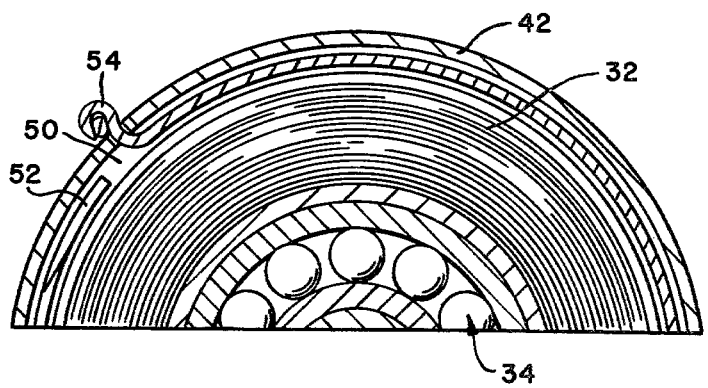
FIG. 2 is a fragmentary, cross sectional view taken substantially along the lines 2—2 of FIG. 1.

Referring now to the drawing, a clutch and fan assembly generally indicated by the numeral 10 includes a driving member 12 which terminates in a flange 14 for connection with the vehicle engine (not shown), so that the driving member 12 is rotated by operation of the engine. The other end of the driving member 12 carries a slip ring assembly generally indicated by the numeral 15. The slip ring assembly includes a member 16 which is fixed for rotation with the driving member 12 and a slip member 18 which is mounted so that the member 16 can rotate relative to the member 18. Connecting wires 20, 22 extend from the members 18 and 16 respectively, so that an electrical connection is provided between the connecting wires 20 and 22 by the members 16 and 18 of the slip ring assembly 15. The connecting wire 20 is connected to appropriate vehicle engine temperature and/or air conditioning pressure sensors of a type well-known to those skilled in the art. Since these sensors are conventional, they will not be described in detail herein. The connecting wire 22 is carried within passage 23 in the driven member 12.

The driving member 12 also carries a circumferentially extending bracket 24 which is made of magnetic material and which is mounted for rotation with the driving member 12. The bracket 24 includes a pair of axially spaced, circumferentially extending pole piece portions 26, 28 which circumscribe the driving member 12 and which cooperate with one another to define a cavity 30 therebetween. An electromagnetic coil comprises windings 32 disposed in the cavity 30 and are wrapped circumferentially around the driving member 12. The windings 32 are connected with the connecting wire 22, so that when an electrical signal is transmitted through the connecting wire 20, electrical current will be transmitted to the coil 32 by the connecting wire 20, the slip ring 15, and the connecting wire 22.

A bearing 34 mounted on the driving member 12 between the bracket 24 and the slip ring assembly 15, mounts a driven member 36 for rotation relative to the driving member 12. Bolts 38 attach fan blades 40 to the driven member 36, so that the fan blades 46 are rotated with the driven member 36. Of course, it will be understood by those skilled in the art that additional fan blades 40 are spaced circumferentially around the perifery of the driven member 36 in a manner well-known to those skilled in the art. The driven member 36 further includes an axially extending portion 42 which projects from the driven member 36 and which circumscribes the pole piece portions 26 and 28 of the bracket 24. The inner circumferential surface 44 of the portion 42 cooperates with the outer circumferential edges 46, 48 of the pole piece portions 26 and 28 to define a gap 50 therebetween. A circumferentially extending band 52 is disposed in the gap 50. One end of the band 52 is connected to the axially extending portion 42 of driven member 36 by connecting mechanism 54. The band 50 extends from the portion 54 in a direction such that the band wraps around the driving member 12 in the direction in which the latter rotates. Of course, driving member 12 is able to rotate in a single direction only, since it is operated directly by the vehicle engine.

The band is made from magnetic material, as are the pole piece portions 26, 28, so that a magnetic circuit is defined consisting of pole piece portions 26, 28 and the band 50. The outer periferal portions 56, 58 of the radially inner edge of the band 52 are adapted to frictionally engage the outer circumferential edges 46, 48 of the pole piece portions 26, 28 when the clutch is engaged. Accordingly, it will be noted that the band 52 bridges the cavity 30 in which the magnetic coil consisting of windings 32 is housed.

MODE OF OPERATION

The various components of the clutch mechanism 10 are illustrated in the drawings in the position they assume when the clutch is disengaged. In this condition, the driven member 12, of course, will be rotated by the vehicle engine, but the driven member 36 will not be driven thereby, because there is no driving connection between the driving member 12 and the driven member 36 and the bearing 34 permits the driving member 12 to rotate without driving the driven member 36 unless the clutch mechanism is engaged. When the aforementioned temperature and/or pressure sensors (not shown) sense an engine operating condition in which operation of the engine cooling fan is required, an electrical signal is transmitted through the connecting wire 20 and 22 to energize the coil comprising the windings 32. When this occurs, magnetic flux created in the magnetic circuit defined by the pole piece portions 26, 28 and the band 52 causes the band to move radially, viewing FIG. 1, in a direction toward the pole pieces 26, 28. Consequently, the outer periferal portions 56, 58 of the inner edges of the band 52 will be brought into engagement with the outer circumferential edges 46, 48 of the pole piece portions 26, 28. When this occurs, the wrapping effect of the band member 52 causes a servo action of the type well known to those skilled in the art in which the relatively small actuating force created by the windings 32 is multiplied by the wrapping effect of the band 52, thereby maintaining the clutch in engagement with enough force to cause the driving member 12 to rotate the driven member 36, thereby providing a driving connection causing the fan blades 40 to rotate with the driving member 12. When the clutch is to be disengaged, current to the windings 32 is turned off, permitting the band 52 to separate from the pole piece portions 26, 28, thereby breaking the driving connection between the driving member 12 and the driven member 36.

I claim:

1. In a clutch, a pair of coaxial relatively rotatable members comprising a driving member and a driven member, one of said members including an axially extending portion, the other member having an outer circumferential surface cooperating with said axially extending portion to define a circumferentially extending gap therebetween, a circumferentially extending band located in said gap, means drivingly engaging one end of said band to said one member, said band extending circumferentially from said one end in the direction of rotation of said driving member, actuating means for forcing said band into driving engagement with said outer circumferential surface of said other member when the clutch is engaged, said actuating means including electromagnetic means carried by said other member and rotatable therewith, a slip ring mounted on the end of said other member, connecting wires connecting said slip ring with said electromagnetic means and connecting said slip ring with a source of electrical current, and bearing means carried by said other member and axially separated from said slip ring for mounting said one member for rotation relative to the other member, said other member including a pair of axially spaced, radially extending sections terminating in circumferentially extending outer edges, said outer edges defining said outer circumferential surface of said other member, said bearing means being located axially between said slip ring and said sections.

2. The invention of claim 1, wherein said one member is the driven member and the other member is the driving member.

3. The invention of claim 1, wherein said electromagnetic means includes a coil having windings wrapped circumferentially around said other member.

4. The invention of claim 1, wherein said other member includes a pair of axially spaced, radially extending portions, said portions terminating in circumferentially extending outer edges, said outer edges defining said outer circumferential surface of said other member.

5. The invention of claim 4, wherein said portions define an axial cavity extending circumferentially about said other member, and said electromagnetic means includes a coil located in said cavity and having windings extending circumferentially around said other member.

6. The invention of claim 5, wherein said band bridges said cavity, and the opposed outer peripheral portions of said band are forced into driving engagement with said edges when the clutch is engaged.

7. The invention of claim 6, wherein said portions and said band are made from magnetic material so that a magnetic circuit is defined consisting of said band and said portions.

8. In a clutch, a pair of coaxial relatively rotatable members comprising a driving member and a driven member, one of said members including an axially extending portion, the other member having an outer circumferential surface cooperating with said axially extending portion to define a circumferentially extending gap therebetween, a circumferentially extending band located in said gap, means drivingly engaging one end of said band to said one member, said band extending circumferentially from said one end in the direction of rotation of said driving member, actuating means for forcing said band into driving engagement with said outer circumferential surface of said other member when the clutch is engaged, said actuating means including an electromagnetic coil, said other member including a pair of axially spaced, radially extending portions terminating in circumferentially extending outer edges, said outer edges defining said outer circumferential surface of said one member, said portions defining an axial cavity extending circumferentially around said other member, said electromagnetic coil comprising windings disposed in said cavity and wrapped circumferentially around said other member, said band having a length substantially greater than its width and thickness and being substantially restrained against circumferential movement relative to said one member by the driving engagement with said one member but being movable radially into engagement with said outer edges of said portions when the coil is actuated, said band having axially spaced, circumferentially extending engagement surfaces engaging said circumferentially extending outer edges of said portions when the coil is actuated whereby the band bridges said axial cavity.

9. The invention of claim 8, and a slip ring mounted on the end of said other member, and connecting wires connecting said slip ring with said electromagnetic means and connecting said slip ring with a source of electrical current.

* * * * *